United States Patent
Towfiq et al.

(10) Patent No.: US 9,964,709 B2
(45) Date of Patent: May 8, 2018

(54) METHODOLOGY AND DESIGN OF FIXTURES FOR PRECISION ALIGNMENT OF MTP/MPO CONNECTORS AND MT FERRULES IN INTERFEROMETRIC END-FACE MEASUREMENTS

(71) Applicants: Farhad Towfiq, Oceanside, CA (US); Iurii Kolomiichuk, Kyiv (UA); Petro Shegedin, Kyiv (UA); Yurii Snisarenko, Kyiv (UA); Andrii Fesenko, Kyiv (UA)

(72) Inventors: Farhad Towfiq, Oceanside, CA (US); Iurii Kolomiichuk, Kyiv (UA); Petro Shegedin, Kyiv (UA); Yurii Snisarenko, Kyiv (UA); Andrii Fesenko, Kyiv (UA)

(73) Assignee: Sumix Corporation, Oceanside, CA (US)

( * ) Notice: Subject to any disclaimer, the term of this patent is extended or adjusted under 35 U.S.C. 154(b) by 0 days. days.

(21) Appl. No.: 14/635,142

(22) Filed: Mar. 2, 2015

(65) Prior Publication Data

US 2016/0259130 A1 Sep. 8, 2016

(51) Int. Cl.
| | |
|---|---|
| G02B 6/38 | (2006.01) |
| G01M 11/08 | (2006.01) |
| G01B 11/27 | (2006.01) |
| G02B 21/00 | (2006.01) |
| G02B 6/42 | (2006.01) |

(52) U.S. Cl.
CPC ............ *G02B 6/385* (2013.01); *G01B 11/272* (2013.01); *G01M 11/088* (2013.01); *G02B 6/3882* (2013.01); *G02B 6/3885* (2013.01); *G02B 6/4292* (2013.01); *G02B 21/0056* (2013.01)

(58) Field of Classification Search
CPC .................................... G03B 6/38; G03B 6/42
USPC ............................................................ 385/89
See application file for complete search history.

(56) References Cited

U.S. PATENT DOCUMENTS

| | | | | |
|---|---|---|---|---|
| 4,973,127 A | * | 11/1990 | Cannon, Jr. .......... | G02B 6/3839 156/158 |
| 6,454,464 B1 | * | 9/2002 | Nolan .................. | G02B 6/3807 385/60 |
| 6,464,408 B1 | * | 10/2002 | Nolan .................. | G02B 6/3807 385/56 |
| 7,004,639 B2 | | 2/2006 | Norland | |

(Continued)

*Primary Examiner* — Kaveh C Kianni
(74) *Attorney, Agent, or Firm* — Loza & Loza, LLP; Heidi Eisenhut

(57) ABSTRACT

Four fixture types are intended for alignment of multi-fiber connectors and ferrules in interferometric microscopes for measuring connector end-face geometry. A methodology of fixtures' calibration ensures validity and accuracy of measurements. First fixture type is equipped with a locking mechanism. In one embodiment it contains two guide holes and is intended for male connectors. In another embodiment intended for female connectors and ferrules it contains two removable guide pins on a bar inserted into the guide holes from back or front side of the fixture. Second fixture type has single window in the base and a pair of guide pins located near opposite sides of the window. Third fixture type has a single window and single guide pin in the base located near one window side. Fourth fixture type has a single guide pin in the center of the base and a pair of windows on both sides of the pin.

6 Claims, 12 Drawing Sheets

(56) References Cited

U.S. PATENT DOCUMENTS

| | | | | |
|---|---|---|---|---|
| 7,775,725 B2* | 8/2010 | Grinderslev | ............. | G02B 6/32 385/55 |
| 2001/0008571 A1* | 7/2001 | Chivers | ................ | G02B 6/3833 385/75 |
| 2001/0026662 A1* | 10/2001 | Chong | ................... | G02B 6/383 385/59 |
| 2003/0002814 A1* | 1/2003 | Dudoff | ................ | G02B 6/4249 385/78 |
| 2003/0147597 A1* | 8/2003 | Duran | ................ | G02B 6/3825 385/76 |
| 2004/0013394 A1* | 1/2004 | Norland | ............... | G02B 6/3807 385/137 |
| 2004/0028344 A1* | 2/2004 | Kang | ................ | G02B 6/12002 385/60 |
| 2009/0154884 A1* | 6/2009 | Chen | ........................ | G02B 6/32 385/79 |
| 2011/0249943 A1* | 10/2011 | Case | .................... | G02B 6/3885 385/59 |
| 2012/0033921 A1* | 2/2012 | Haley | .................... | G02B 6/383 385/78 |
| 2012/0281951 A1* | 11/2012 | Takahashi | ............ | G02B 6/3846 385/80 |
| 2013/0121653 A1* | 5/2013 | Shitama | ................ | G02B 6/255 385/96 |
| 2015/0198766 A1* | 7/2015 | Takahashi | ............ | G02B 6/2558 385/78 |
| 2015/0355417 A1* | 12/2015 | Takano | ................ | G02B 6/3825 385/60 |

* cited by examiner

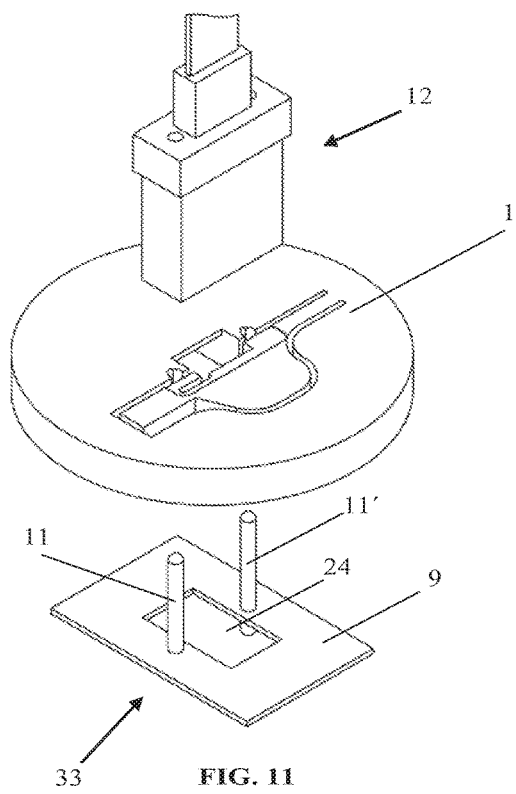
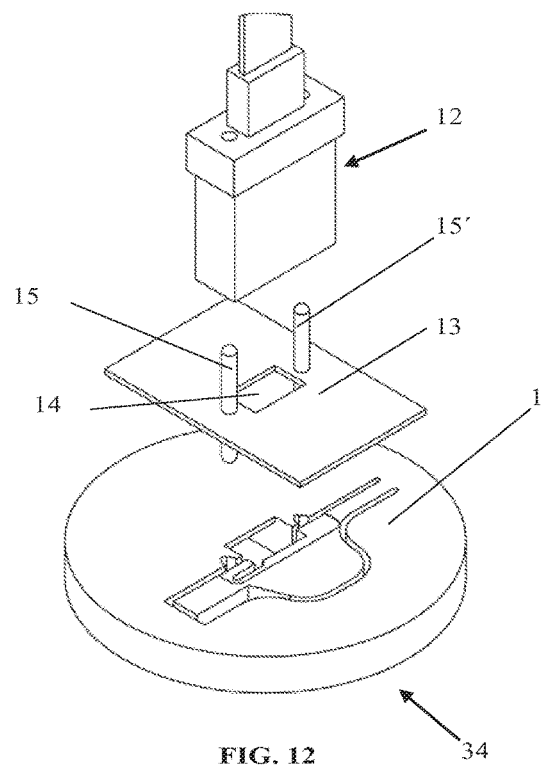
FIG. 11
FIG. 12

METHODOLOGY AND DESIGN OF FIXTURES FOR PRECISION ALIGNMENT OF MTP/MPO CONNECTORS AND MT FERRULES IN INTERFEROMETRIC END-FACE MEASUREMENTS

CROSS-REFERENCE TO RELATED APPLICATIONS

Not applicable.

BACKGROUND

Field of the Invention

This invention relates to the field of measuring end-face geometry of fiber optic connectors by means of interferometric microscopes. More specifically, the invention comprises four types of fixtures for precise positioning and measurements of multi-fiber MTP/MPO Multi-fiber Termination Push-on (MTP)/Multi-fiber push on (MPO) connectors and mechanical transfer (MT) ferrules by the interferometric microscopes. The invention also includes a methodology of calibration of the fixtures to ensure validity and accuracy of measurements.

Description of the Related Art

In order for fiber optic connectors to be inspected by interferometric microscopes, a special adapter must be used for precise alignment of fiber optic connectors. By precise alignment here we mean two conditions. The connector must be in a fixed position in the vicinity of the focal plane of the lenses. The image of its end-face must be in the center of the camera sensor. Also, such adapter must ensure that the connector guide holes or guide pins are parallel to the optical axis of the microscope.

In fiber optics plugs precise nose-to-nose alignment is implemented by guide pins of one connector that fit into the guide holes of the receiving connector (see, for example U.S. Pat. No. 4,973,127).

In the present invention, the precise alignment of connector in interferometric system is also implemented with the use of guide pins. One embodiment of the first fixture type and fixture types 2, 3 and 4 contain guide pins which fit into the guide holes of female fiber optic connectors. Another embodiment of the first fixture type contains guide holes in which the guide pins of male connectors are inserted.

There is a known adapter for positioning of fiber optic connectors for use together with an interferometric optical microscope, namely a holding fixture (see U.S. Pat. No. 7,004,639).

An improvement of the present invention compared to the above mentioned holding fixture is that additional precision in the first fixture type is ensured by a locking mechanism.

Another improvement is that there are removable guide pins in the first fixture type, so the same universal fixture can be used for both male and female connectors. In the latter case, the removable guide pins on a bar are inserted into the guide holes in the fixture base. This is a more cost-effective solution than two different fixtures for two different connector genders.

The removable guide pins can be inserted into the fixture base from front side or from back side of the base.

Inserting guide pins from front side is convenient when there is a need to inspect the same MTP/MPO connector first as a female type (without the guide pins) and then as a male type (with the guide pins) or vice versa. In such a case, a technician responsible for measuring the ferrules will not need to dismount the whole fixture assembly and then mount another fixture assembly. One option is to insert the removable guide pins into the fixture base already mounted on the interferometer.

Another option is to insert the guide pins into a connector first. Then the connector with the inserted guide pins is locked in the fixture by the locking mechanism. The technician will be able to choose the way of insertion more convenient to them.

Advantage of the fixture with the locking mechanism is unstiffened position of the guide pins while the lock is open. When inserting a connector into the fixture, the guide pins can move without restraint. As a result, the risk of damage of both the guide holes and the guide pins is reduced in case of fixtures with fixed pins.

The length of the guide pins in the holding fixture described in U.S. Pat. No. 7,004,639 is 4.5 mm±0.5 mm. The length of the guide pins in the second fixture type described in the present invention is 1.8-3.5 mm. The smaller length of the guide pins is an improvement of the present invention because they cause less damage to connector guide holes that have some deviation from being parallel. In the same time, the required level of measurement accuracy is preserved.

It is proven by a series of measurements that with the length of the guide pins 1.8-3.5 mm the surface angle measurements accuracy is within the required limits of ±0.015 degrees.

The smaller length of guide pins simplifies fixture production. It is easier to keep the necessary tolerance of center-to-center spacing between the pins in case of shorter pins.

The third and the fourth fixture types represented in the present invention have single guide pin instead of a pair of the guide pins. Single guide pin in the fixture is a novelty. It is an improvement because there is no need to keep a precise center-to-center spacing as in case of the double pins.

Both guide holes in ferrules and guide pins in fixtures are not strictly parallel. There is some deviation within tolerance. Inserting the guide pins into the guide holes can cause mutual tension and deformation. Single pin eliminates such negative effect of parallelism deviation. In addition, with the single-pin fixture only one guide hole at a time undergoes physical impact and is susceptible to deformation.

One more advantage of the single pin fixture is that it allows measuring of a calibration factor of a reference ferrule. This calibration method is outlined in the detailed description of the invention.

In U.S. Pat. No. 7,004,639 the invention of the fixture is accompanied with a method of calculation of fixture calibration factor. As described in the above mentioned patent, it is calculated from two measurements of a connector in the first and second orientations.

However, there is a measurement problem which is not solved by the above mentioned patent. Offset angles measured for the first and second orientations consist of fixture angles and ferrule angles. There is no explanation how to measure ferrule angles and calculate an exact value of fixture calibration factor.

The present invention provides a solution to this problem. It is possible to measure ferrule angles using the fixture type 4. The special two-window design of the fixture allows this. The ferrule used for calibration of the fixture is called a reference ferrule in this invention. Angles of the reference ferrule along axis X and axis Y are called reference angles.

Knowing the exact reference angle values of the ferrule, we can easily calculate calibration factors of fixtures type 1, 2 and 3 simply by subtracting the ferrule reference angle from the total measured angle. This is an improvement of the present invention.

BRIEF SUMMARY OF THE INVENTION

The present invention consists of four types of fixtures that are used for measuring multi-fiber MTP/MPO connectors and MT ferrules. The fixtures are intended for use with interferometric microscopes. The fixtures are mounted on the interferometric microscope. Connector or ferrule is inserted into the fixture for the purpose of interferometry scanning.

The fixture of the first type is equipped with a locking mechanism and hereafter referred to as fixture type 1. This fixture has two embodiments. In one embodiment, the fixture contains two guide holes. This embodiment of the fixture type 1 is hereafter referred to as fixture type 1a. In another embodiment, there are two guide pins inserted into the guide holes. This embodiment of the type 1 is hereafter referred to as fixture type 1b. The guide pins can be inserted from the back side or from the front side of the fixture base.

In the first embodiment type 1a, MTP/MPO male connectors are precisely aligned relative to the optical axis of the interferometric microscope. The guide pins of the connectors fit into the guide holes of the fixture which are parallel to the optical axis of the interferometric microscope. The locking mechanism enables precise connector alignment by means of simultaneous locking of two pins of the connector inserted into the guide holes of the fixture.

In the second embodiment type 1b, the fixture type 1a is accompanied with two pins on a bar inserted into the guide holes of the fixture base from back side or front side of the fixture. The guide can have length from 1.8-3.5 mm.

The fixing of the guide pins is not strictly rigid. This enables unstiffened position of the pins in the inserted female connector or ferrule. The guide pins are locked by the locking mechanism after they have been inserted into the connector or ferrule. The locking mechanism of the fixture enables precise alignment of the female connector or ferrule by means of simultaneous locking of two pins of the fixture inserted into the connector or ferrule.

The fixture type 1 is used for measuring multi-fiber connectors of MTP/MPO types and MT ferrules. Precise alignment of connectors and ferrules is ensured by the locking mechanism and pins.

The fixture of the second type has one window in the base and two guide pins located near opposite sides of the window. It is hereafter referred to as fixture type 2.

The fixture type 2 is used for measuring multi-fiber MTP/MPO female connectors and MT ferrules. Precise alignment of connectors and ferrules in the interferometric system is ensured by the guide pins of the fixture. The guide pins are fixed in the base and can have length from 1.8-3.5 mm.

The fixture of the third type has one window and one guide pin in the base located near one window side. It is hereafter referred to as fixture type 3.

The fixture type 3 is used for measuring multi-fiber MTP/MPO female connectors and MT ferrules. Precise alignment of connectors and ferrules is ensured by the guide pin of the fixture. The guide pin is fixed in the base and can have length from 3-6 mm.

The fixture of the fourth type has one guide pin in the center of the base and two windows on both sides of the pin. This fixture is hereafter referred to as fixture type 4. The guide pin of the fixture is fixed in the base and can have length from 3-6 mm.

The fixture type 4 is used for pre-calibration of a reference ferrule.

To ensure high precision alignment of the pins in the fixtures type 1, 2 and 3 relative to the optical axis of the interferometric microscope, the fixtures are calibrated using a reference ferrule which in turn is calibrated using the fixture type 4.

The fixture type 4 allows measuring reference angles X and Y of the ferrule relative to one guide hole for half of the end-face near the guide hole. This procedure is also called calibration of one guide hole of reference ferrule.

Calibration of the fixture type 3 is done by means of a reference ferrule with one pre-calibrated guide hole. The pin of the fixture is inserted into the pre-calibrated guide hole of the ferrule. Angle values are measured. Then calibration factors of the fixture are calculated.

Using calibration factors of the fixture type 3, it is possible to calibrate two guide holes of a reference ferrule. First the guide pin of the fixture is inserted into the first guide hole, then into the second guide hole. Angles are measured for the first position and then for the second position of the reference ferrule. Then fixture reference angles are calculated. This procedure is also called pre-calibration of two guide holes of the reference ferrule or reference ferrule pre-calibration.

Verification and calibration of fixture types 1 or 2 is done by means of a pre-calibrated reference ferrule. Two sets of angle values are obtained for first and second positions of the reference ferrule in the fixture. Then calibration factors of the fixture are calculated.

BRIEF DESCRIPTION OF THE DRAWINGS

FIG. 3 is a top view of the fixture with locking mechanism type 1a.

FIG. 9-12 illustrate how a female connector or a ferrule is inserted into the fixture. The guide pins of the fixture fit into the guide holes of the connector or ferrule.

FIG. 22 and FIG. 24 also illustrate two calibration steps of a reference ferrule.

Position 1 in FIG. 26 shows a method of calibration of the fixture type 3.

REFERENCE NUMERALS IN THE DRAWINGS

| | |
|---|---|
| 1 fixture base | 2 window |
| 3 and 3' guide holes | 4 lever |
| 5 recess | 6 spring |
| 7 male connector | 8, 8' guide pins of male connector |
| 9 bar with pins inserted from back side of fixture | 10 locking mechanism |
| 11, 11' guide pins | 12 female connector |
| 13 bar with pins inserted from front side of fixture | 14 window |
| 15, 15' guide pins | 16 fixture base |
| 17, 17' guide pins | 18 window |
| 20, 20' guide holes of female connector | 21 fixture base |
| 22 guide pin | 23 window |
| 24 window | 25 opening on microscope front panel |
| 26 fixture base | 27 pin |
| 28, 28' windows | 30 interferometric microscope |
| 32 fixture type 1a | 33 first embodiment of fixture type 1b |
| 34 second embodiment of fixture type 1b | 35 fixture type 2 |
| 36 fixture type 3 | 37 fixture type 4 |
| 38, 38' guide holes of reference ferrule | 39 first calibration step |
| 40 second calibration step | 41 first calibration step |
| 42 second calibration step | 43 reference ferrule |

DETAILED DESCRIPTION OF THE INVENTION

The presented fixture types 1, 2, 3 and 4 will now be described in detail with reference to the drawings.

Figure 1:
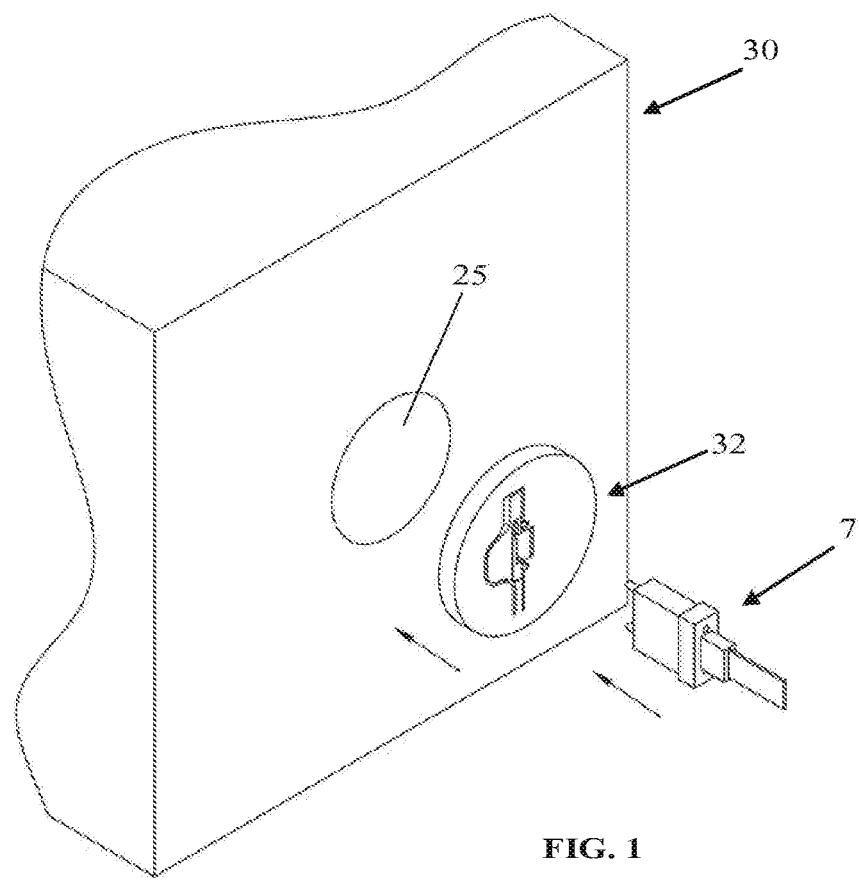
FIGS. 1 and 2 demonstrate intended use of the fixtures represented in this invention using the example of fixture type 1a. Orthogonal view in FIG. 1 and phantom view in FIG. 2 show that a fixture is mounted on the interferometric microscope and a connector is inserted into the fixture.
Figure 2:
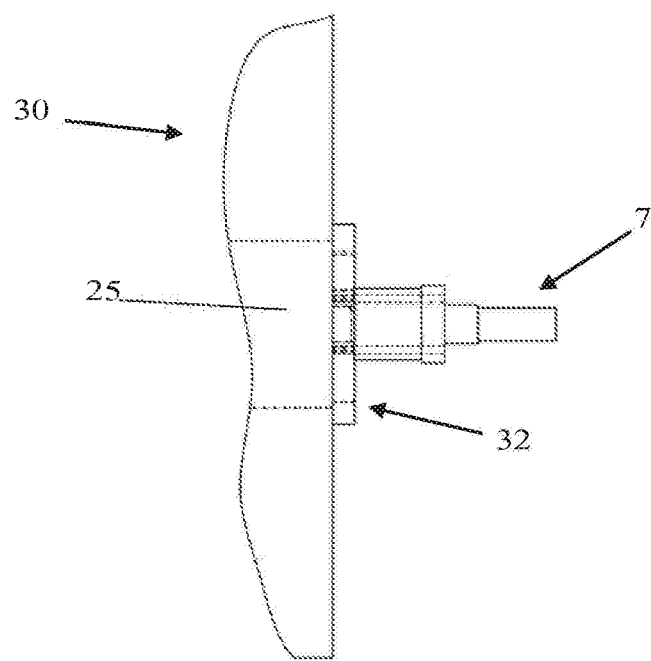
Figure 3:
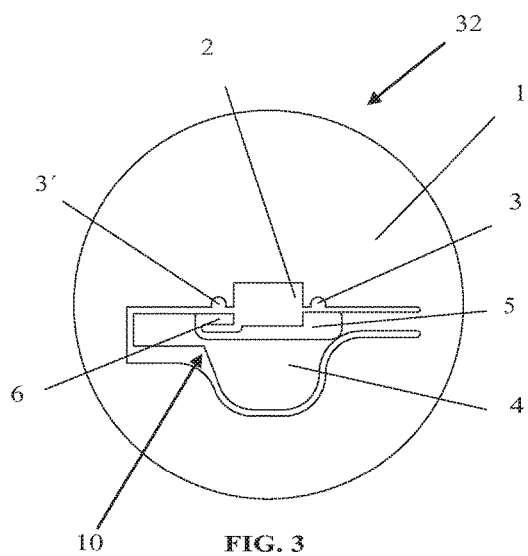
Figure 4:
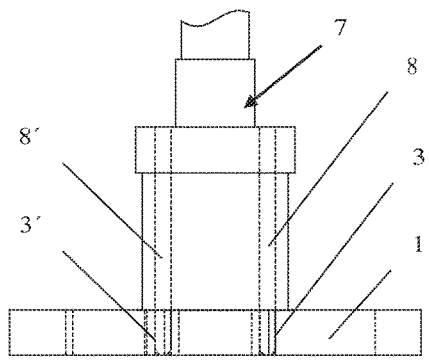
FIG. 4 is a phantom view of the fixture with locking mechanism type 1a with inserted mail connector. It shows that guide pins of the male connector fit into the guide holes of the fixture.

On FIGS. 1 and 2 the reference number 30 represents an interferometric microscope. A fixture 32 is mounted on the microscope which has an opening 25 to receive the fixture. Reference number 7 represents multi-fiber MTP/MPO connector or MT ferrule which is inserted into the fixture 32. FIG. 1 shows a common way to use all fixture types 1, 2, 3 and 4 together with interferometric microscopes by mounting them on the microscope and inserting a connector into a fixture. FIG. 2 is a phantom side view of an interferometric system ready for measurements with the fixture 32 fixed on the interferometer and the connector 7 inserted into the fixture.

Referring to FIG. 3-6, the first embodiment 1a of fixture type 1 is shown represented by a reference number 32. The fixture 32 consists of a base 1, a window 2, first and second guide holes 3 and 3', and a locking mechanism 10. The window is shaped in a way to receive a multi-fiber MTP/MPO male connector. The locking mechanism 10 consists of a lever 4, a recess 5 and a spring 6.

Figure 5:
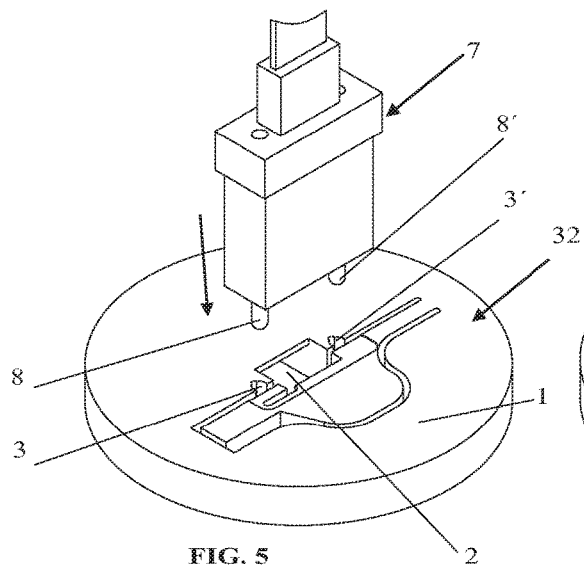
FIG. 5 and FIG. 6 illustrate the way the male connector is inserted into the fixture.
Figure 6:
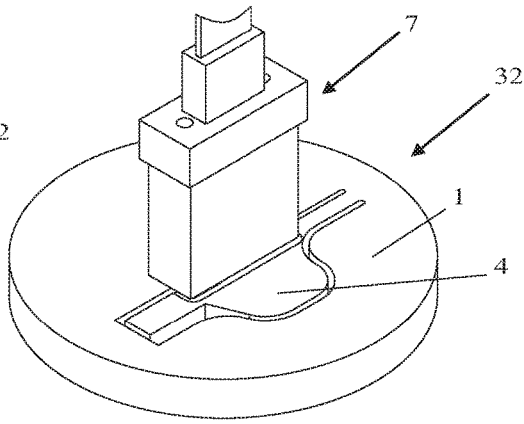
Figure 7:
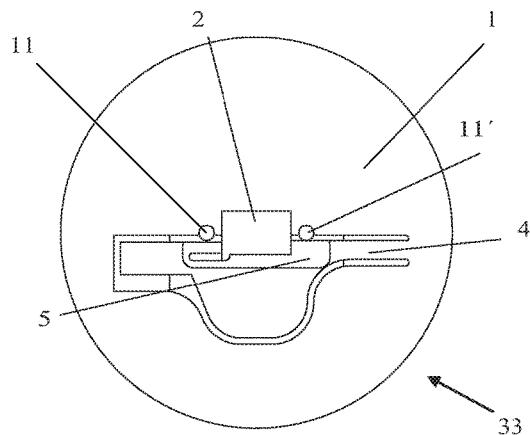
FIG. 7 and FIG. 8 are top views of fixture with locking mechanism type 1 b. On FIG. 7 the guide pins are inserted from the back side of the fixture, and on FIG. 8 from the front side.
Figure 8:
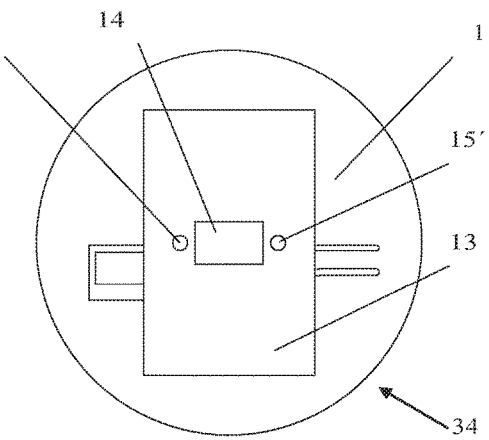
Figure 9:
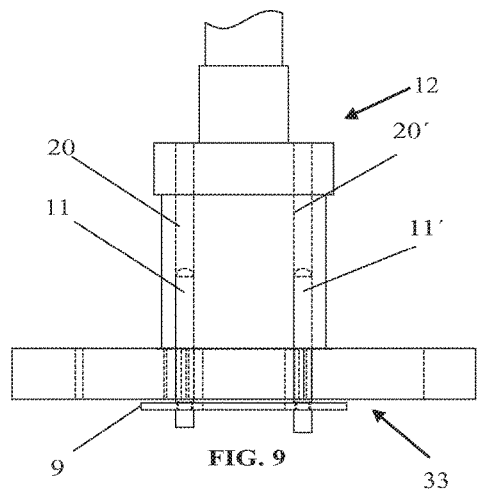
Figure 10:
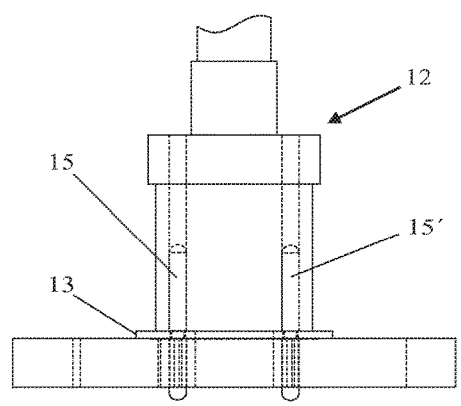
Figure 13:
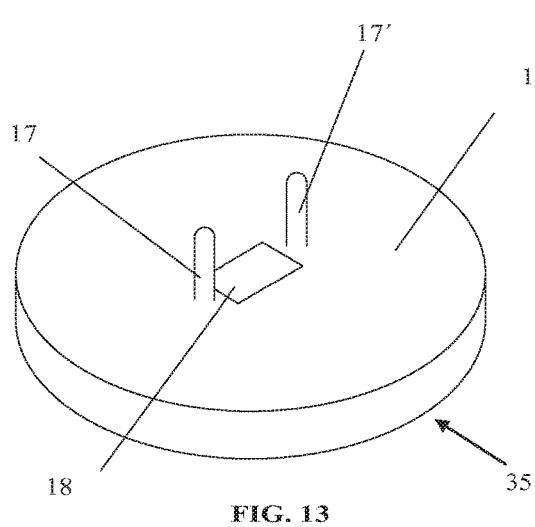
FIG. 13-16 are illustrations of fixture type 2 with two guide pins and one window and the way the guide pins of the fixture fit into the guide holes of a female connector or ferrule.

FIG. 5 shows the multi-fiber MTP/MPO male connector 7 with the first and second guide pins 8 and 8'. The guide pins are inserted into the guide holes 3 and 3' and then the lever 4 is locked. The connector is fixed in the fixture as shown on FIG. 6 in a precise and repeatable orientation along the optical axis of the microscope.

Referring to FIG. 7-12, the second embodiment 1b of fixture type 1 is shown represented by reference numbers 33 and 34. The fixtures 33 and 34 have the same base 1 as fixture 32, including the window 2, first and second guide holes 3 and 3', and the locking mechanism 10. The fixture type 1b is adapted to receive a multi-fiber MTP/MPO female connector.

FIG. 7-12 show that fixture type 1b is accompanied with a bar with the first and second guide pins. On FIGS. 7, 9 and 11 the bar 9 contains the first and second guide pins 11 and 11' inserted from the back side of the fixture 33. On FIGS. 8, 10 and 12 the bar 13 contains the first and second guide pins 15 and 15' inserted from the front side of the fixture 34. Both bars 9 and 13 contain windows 24 and 14 that do not overlap with window 2 in the base.

FIG. 9-12 show the multi-fiber MTP/MPO female connector 12 with the first and second guide holes 20 and 20'. The guide pins 11, 11' or 15, 15' of the fixtures 33 and 34 respectively are inserted into the guide holes 20 and 20'. Then the lever 4 is locked. The connector is fixed in the fixture as shown on FIGS. 9 and 10 in a precise and repeatable orientation along the optical axis of the microscope.

Referring to FIG. 13-16, the fixture type 2 is shown represented by reference number 35. The fixture 35 consists of a base 16, a window 18, the first and second guide pins 17 and 17'. The window 18 has a shape adapted to a multi-fiber MTP/MPO female connector 12.

Figure 14:
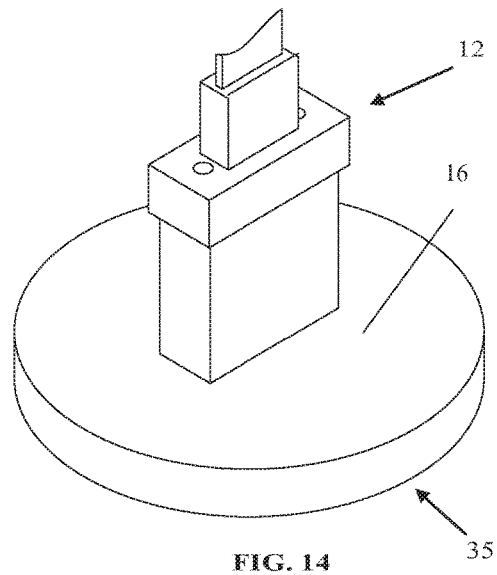
Figure 15:
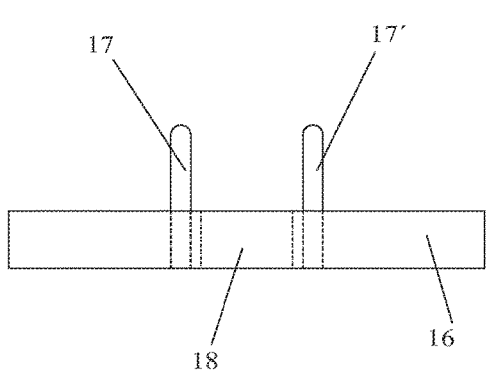
Figure 16:
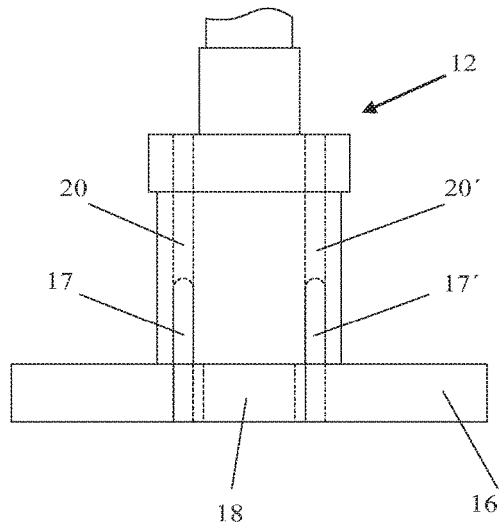
Figure 17:
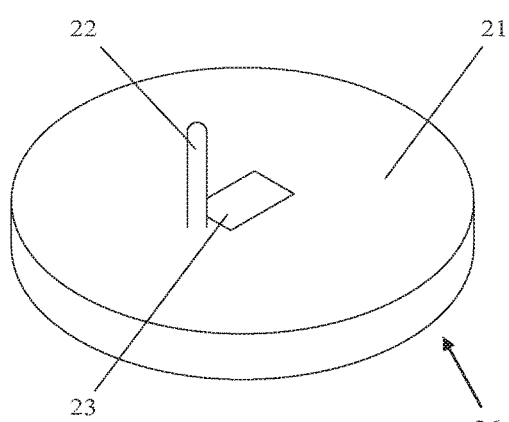
FIG. 17-20 are illustrations of fixture type 3 with single guide pin and one window and the way the guide pin of the fixture fit into one of the guide holes of a female connector or ferrule.

FIGS. 14 and 16 show the multi-fiber MTP/MPO female connector 12 with the first and second guide holes 20 and 20'. When inserting the connector 12 into the fixture 35, the guide pins of the fixture are inserted into the guide holes of the connector. The connector is fixed in the fixture as shown on FIGS. 14 and 16 in a precise and repeatable orientation along the optical axis of the microscope.

Referring to FIG. 17-20, the fixture type 3 is shown represented by reference number 36. The fixture 36 consists of a base 21, a window 23 and a guide pin 22. The window 23 has the shape adapted to receive a multi-fiber MTP/MPO female connector 12.

Figure 18:
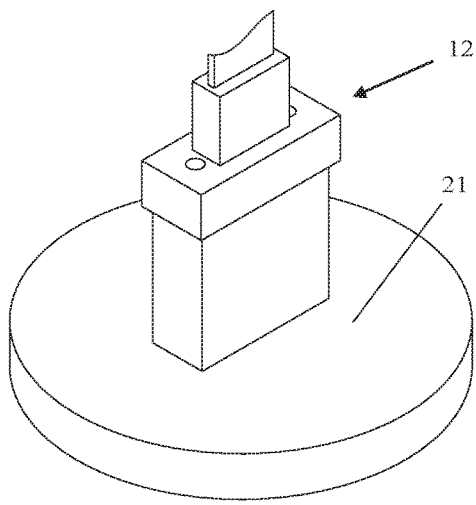
Figure 19:
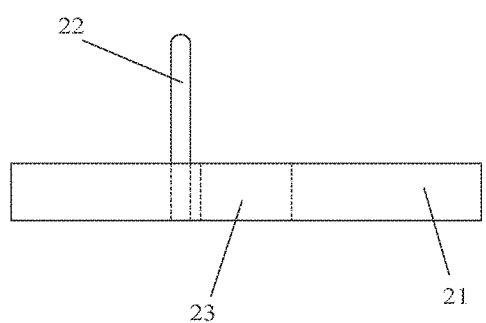
Figure 20:
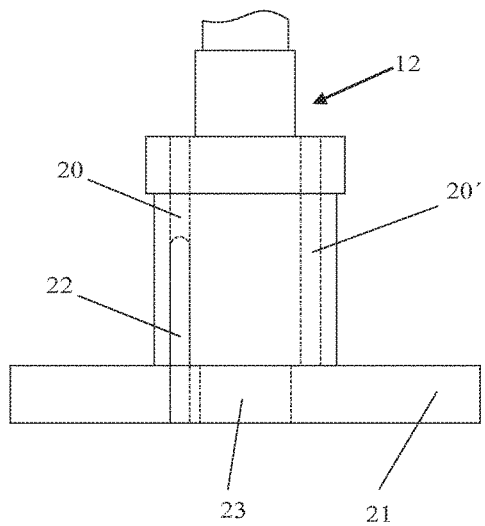
Figure 21:
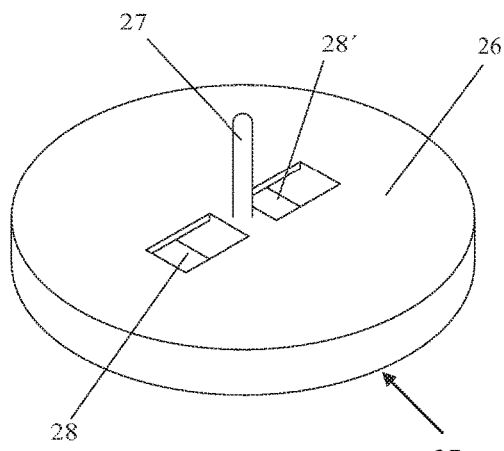
FIG. 21-24 are illustrations of fixture type 4 with single guide pin and double windows and the way the guide pin of the fixture fit into a guide hole of female connector or ferrule.

FIGS. 18 and 20 show multi-fiber MTP/MPO female connector 12 with the first and second guide holes 20 and 20'. When inserting the connector 12 into the fixture 36, the guide pin of the fixture is inserted into one guide hole of the connector. The connector is fixed in the fixture as shown on FIGS. 18 and 20 in a precise and repeatable orientation along the optical axis of the microscope.

Referring to FIG. 21-24, the fixture type 4 is shown represented by reference number 37. The fixture 37 consists of a base 26, first and second windows 28 and 28', and a guide pin 27. The windows 28 and 28' have shapes each adapted to accommodate one half of the end-face of a multi-fiber MTP/MPO female connector 12.

Figure 22:
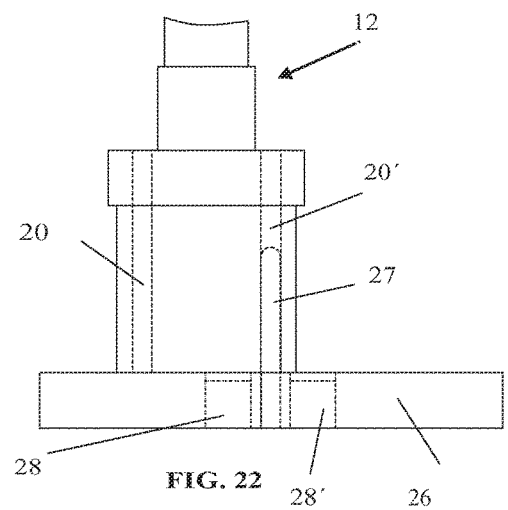
Figure 23:
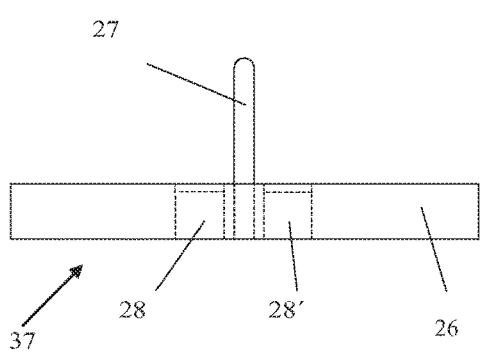
Figure 24:
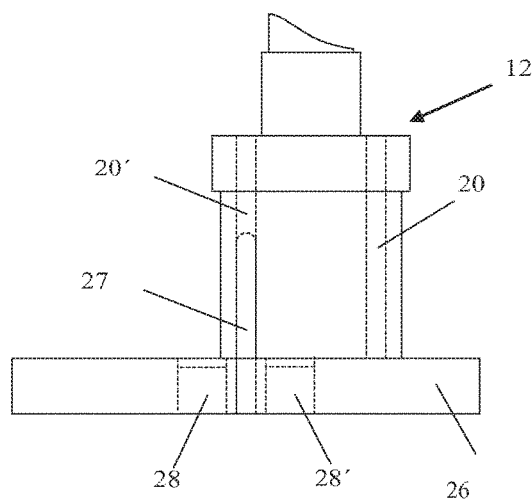

FIGS. 22 and 24 show multi-fiber MTP/MPO female connector 12 with the first and second guide holes 20 and 20'. When inserting the connector 12 into the fixture 37, the guide pin of the fixture is inserted into one guide hole of the connector. The connector is fixed in the fixture as shown on FIGS. 22 and 24 in a precise and repeatable orientation along the optical axis of the microscope.

Figure 25:
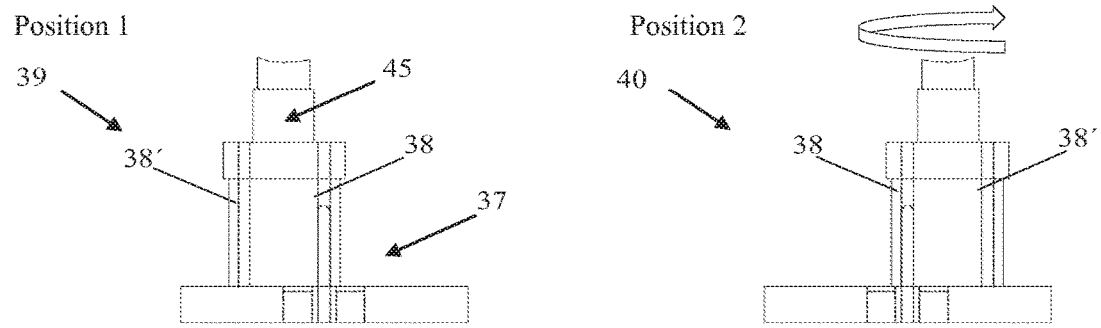
FIGS. 25 and 28 show a method and a procedure of calibration of one guide hole of a reference ferrule.
Figure 28:
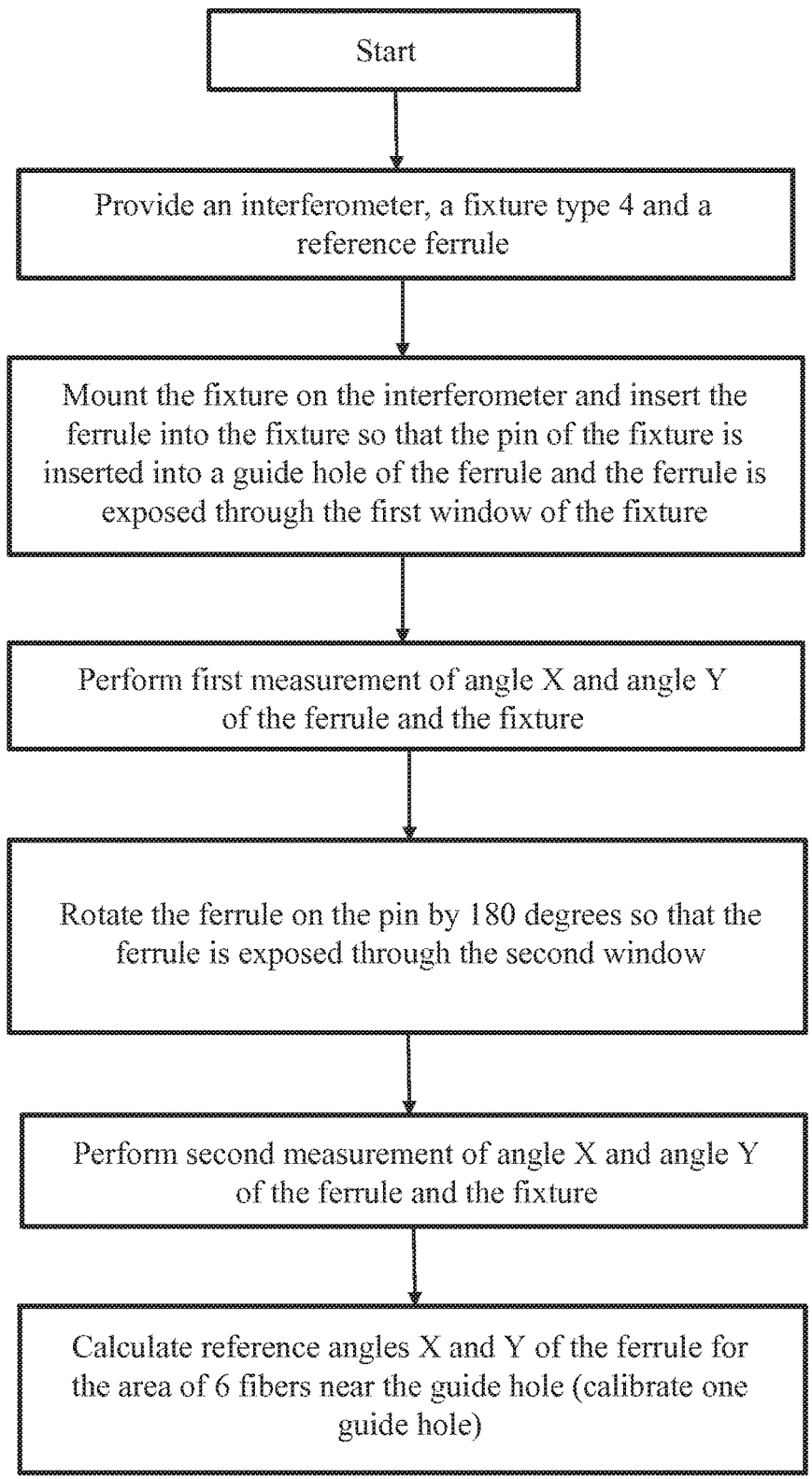

FIGS. 25 and 28 demonstrate a method of pre-calibration of one guide hole of a reference ferrule using the fixture type 4. The method comprises two measurements of ferrule angles along axis X and Y. The fixture 37 is mounted on the interferometric microscope 30 and a reference ferrule 45 is inserted in the fixture as shown on FIG. 2. The pin of the fixture is inserted into one of the guide holes of the reference ferrule.

As demonstrated on FIG. 25, in the first step 39 the ferrule 45 occupies one position in which the ferrule is exposed through the first window of the fixture 37. First measurement of angles X and Y is done. In the second step 40 the ferrule is rotated 180 degrees on the pin. It occupies another position in which it is exposed through the second window of the fixture. The second measurement of angles X and Y is done.

Absolute difference of the two angle values measured in step 1 and step 2 constitutes reference angle offset values X and Y of one guide hole of the ferrule for area of six fibers (half of the end-face) near the guide hole. No systematic angle components of the interferometric microscope and the fixture are included in the resulting values.

Figure 26:
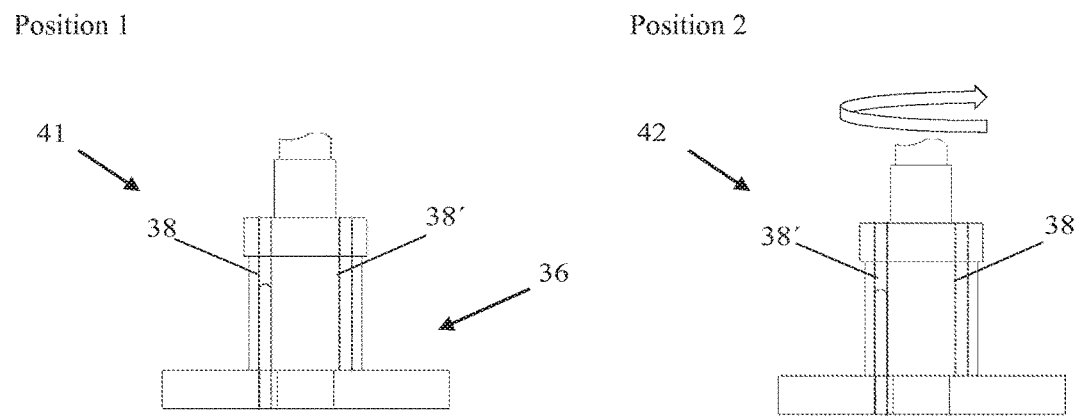
FIGS. 26 and 30 show a method and a procedure of calibration of two guide holes of a reference ferrule.
Figure 29:
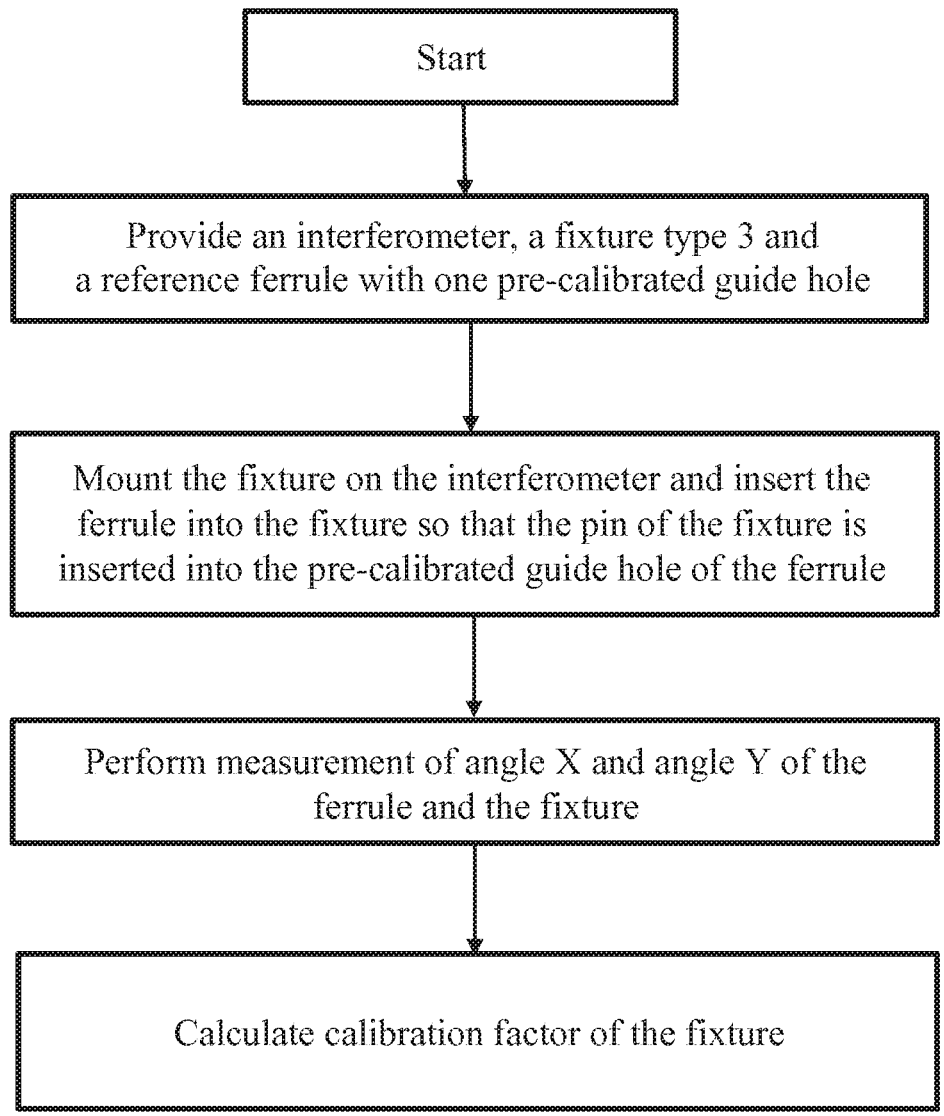
FIG. 29 illustrates a procedure of calibration of the fixture type 3.

Position 1 in FIG. 26 and FIG. 29 demonstrate a method of calibration of the fixture type 3 using the reference ferrule with one guide hole pre-calibrated by the fixture type 4. The method consists of one measurement step. The fixture 36 is mounted on the interferometric microscope 30 and a reference ferrule 45 is inserted into the fixture as shown on FIG. 2. The guide pin of the fixture is inserted into the pre-calibrated guide hole of the reference ferrule.

Measurement of angle values is performed. Resulting calibration factors of the fixture type 3 are calculated as an absolute difference between the measured angles and reference offset angles of the pre-calibrated ferrule guide hole.

Figure 30:
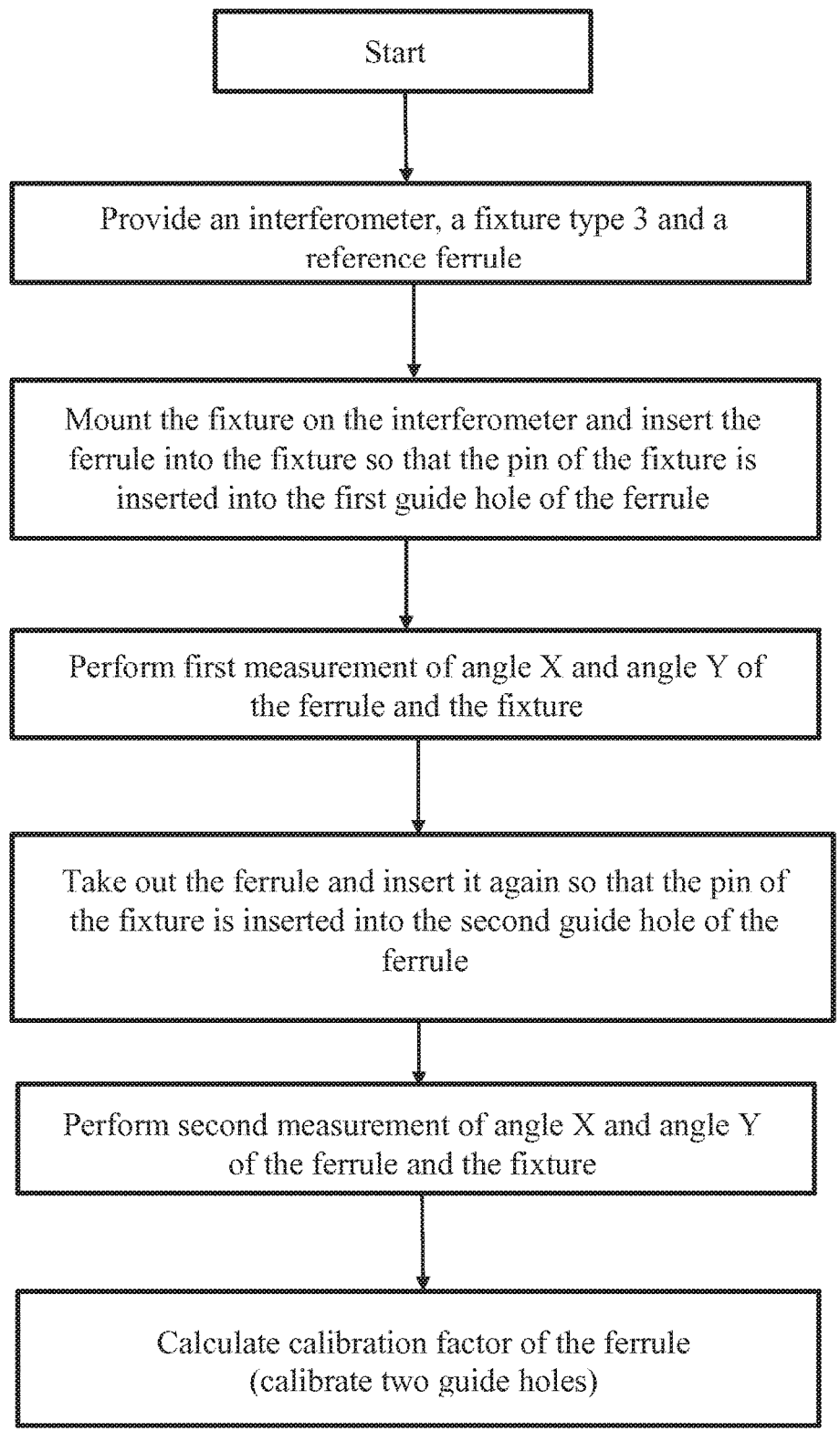

FIG. 26 and FIG. 30 demonstrate a method of calibration of two guide holes of a reference ferrule using fixture type 3. The method consists of two measurement steps. In the first step 41 the ferrule occupies one position in which the pin of the fixture is inserted into the first guide hole of the ferrule. The first measurement of angles X and Y is performed. Then the ferrule is removed from the fixture and is inserted again to occupy another Position 2. In this position, the guide pin of the fixture is inserted into the second guide hole of the ferrule. The second measurement of angles X and Y is done.

Resulting offset angles of the reference ferrule for two guide holes of the ferrule are calculated as an absolute difference between the measured angles and reference angles of the fixture type 3.

Figure 27:
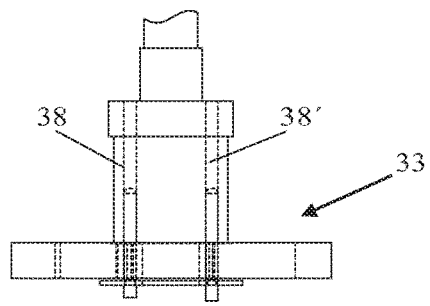
FIGS. 27 and 31 show a method and a procedure of calibration of the fixture types 1 or 2.
Figure 31:
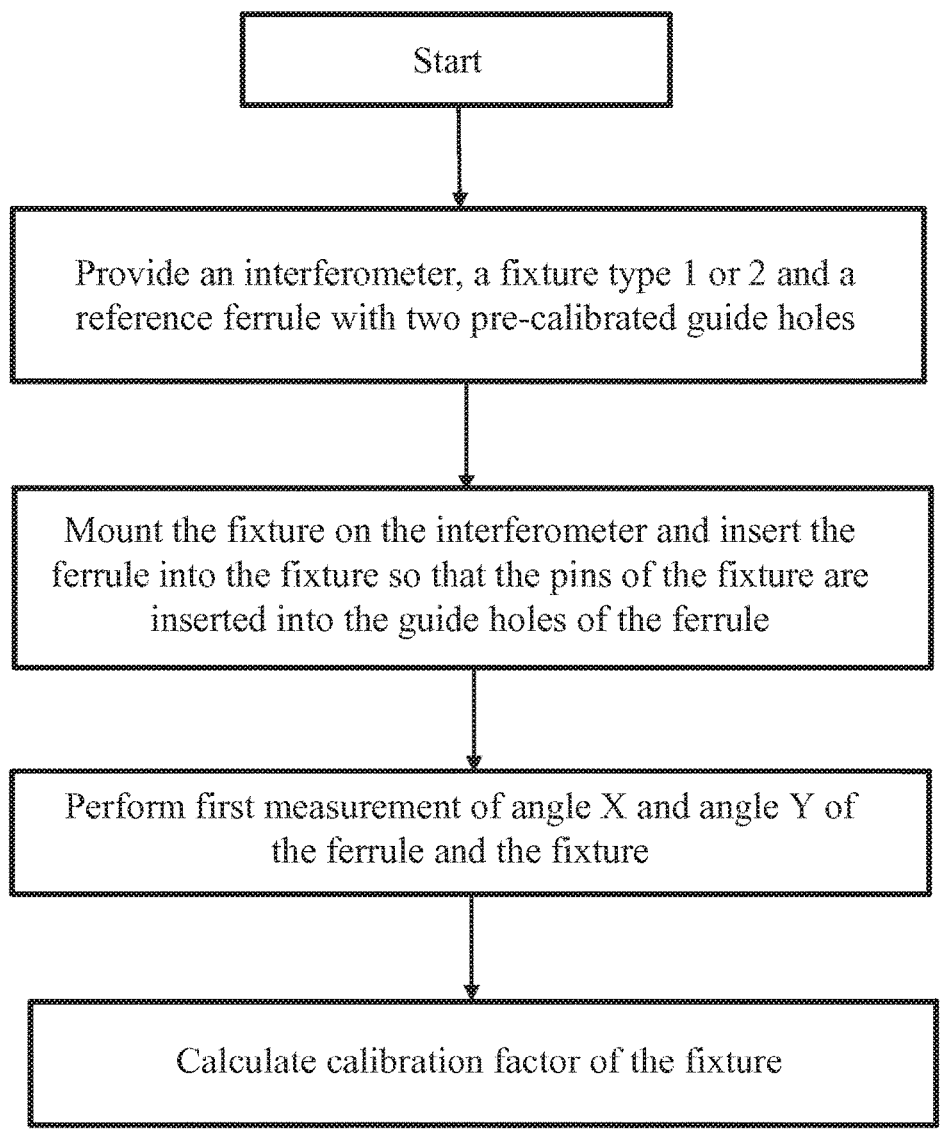

FIGS. 27 and 31 demonstrate a method of calibration of fixture types 1 and 2 using a reference ferrule with two pre-calibrated guide holes. The fixture type 1 or 2 is mounted on the interferometric microscope 30 and a reference ferrule is inserted into the fixture similarly to the previous calibration methods.

The method consists of one measurement step. Angle offset values along axis X and Y are measured. Resulting offset angles of the fixture type 1 or 2 are calculated as an absolute difference between the measured values and reference offset angles of the reference ferrule with two pre-calibrated guide holes. The offset angles of the fixture constitute fixture calibration factors.

We claim:

1. A fixture configured for measuring multi-fiber connectors or ferrules with an interferometric microscopes, the fixture comprising:
   a base having first and second planar surfaces and configured to attach to an interferometric microscope with at least the second planar surface facing the interferometric microscope;
   a guide pin disposed on the base and extending approximately perpendicular to the first planar surface of the base and configured to fit into at least one guide hole of a female multi-fiber connector or ferrule to allow orientation of the female multi-fiber connector or ferrule with respect to the optical axis of the interferometric microscope; and
   first and second window openings in the first and second planar surfaces of the base and through the base, the first and second window openings respectively disposed on different sides of the guide pin, wherein the first and second window openings are sized to be approximately equal to one half the area of an end face of the female multi-fiber connector or ferrule that contacts the planar surface of the base when placed on the guide pin such that light from the interferometric microscope illuminates approximately one half of the end face of the female multi-fiber connector when placed on the guide pin for measurement of the female multi-fiber connector.

2. The fixture of claim 1, further comprising:
   the female multi-fiber connector or ferrule including at least one of a Multi-fiber Termination Push-on (MTP) connector, a Multi-fiber push on (MPO) connector, and a mechanical transfer (MT) ferrule.

3. The fixture of claim 1, wherein a length of the guide pin is sized in a range from about 3 to 6 millimeters.

4. The fixture of claim 1, wherein the placement of the first and second windows relative to the guide pin allow measurement of the female multi-fiber connector from two opposite views, where a first view of the two opposite views is derived by placing the guide pin in one guide hole of the female multi-fiber connector or ferrule and a second view of the two opposite views is derived by rotating the female multi-fiber connector 180 degrees on the pin.

5. The fixture of claim 1, wherein the placement of the first and second windows relative to the guide pin allow measurement of the female multi-fiber connector from two opposite views, where a first view of the two opposite views is derived by placing the guide pin in a first guide hole of the female multi-fiber connector or ferrule and a second view of the two opposite views is derived by placing the guide pin in a second guide hole of the female multi-fiber connector.

6. The fixture of claim 1, wherein the guide pin is a single pin for aligning the optical axis of the interferometric microscope with the female multi-fiber connector and is thereby configured to lessen physical impact and deformation of guide holes of the female multi-fiber connector by engaging with only one guide hole at a time during placement of the female multi-fiber connector on the base.

* * * * *